H. B. LOWDEN.
CONVEYER MECHANISM.
APPLICATION FILED OCT. 25, 1913. RENEWED MAR. 1, 1916.

1,199,580.

Patented Sept. 26, 1916.
2 SHEETS—SHEET 1.

Attest:
Edwd R. Tolson
H. L. Alden

Inventor:
Hugh B. Lowden,
by Middleton Donaldson
Attys

H. B. LOWDEN.
CONVEYER MECHANISM.
APPLICATION FILED OCT. 25, 1913. RENEWED MAR. 1, 1916.

1,199,580.

Patented Sept. 26, 1916.
2 SHEETS—SHEET 2.

Attest:
Ewd L. Johson
H. L. Alden

Inventor:
Hugh B. Lowden,
by
Attys.

UNITED STATES PATENT OFFICE.

HUGH B. LOWDEN, OF DENVER, COLORADO, ASSIGNOR TO COLORADO IRON WORKS COMPANY, OF DENVER, COLORADO, A CORPORATION OF MAINE.

CONVEYER MECHANISM.

1,199,580.  Specification of Letters Patent.  Patented Sept. 26, 1916.

Application filed October 25, 1913, Serial No. 797,254. Renewed March 1, 1916. Serial No. 81,554.

*To all whom it may concern:*

Be it known that I, HUGH B. LOWDEN, citizen of the United States, residing at Denver, Colorado, have invented certain new and useful Improvements in Conveyer Mechanism, of which the following is a specification.

My present invention relates to improvements in conveyer mechanism, and has among others for its objects to provide a simple, economical, durable and efficient mechanism for producing a reciprocatory motion of the conveyer flights in two different planes.

The invention includes the novel construction and arrangement and combination of parts as defined by the appended claims.

In order that my invention may be the better understood, I append hereto drawings illustrating my preferred forms or embodiments thereof, in which drawings—

Figure 1:
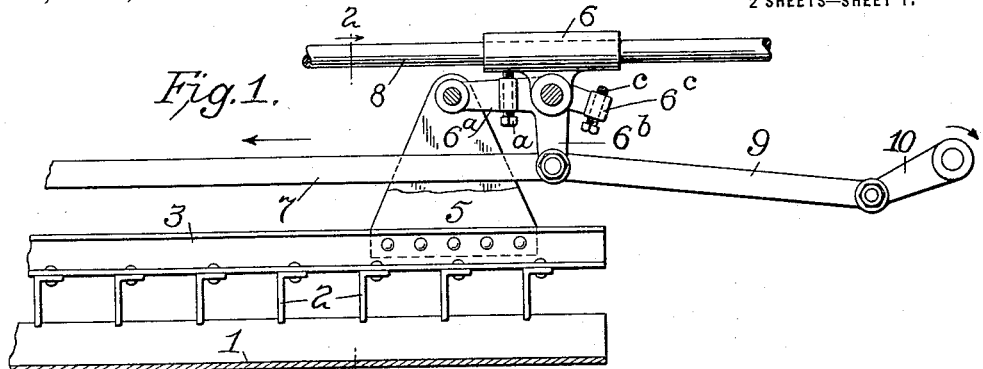
Figure 2:
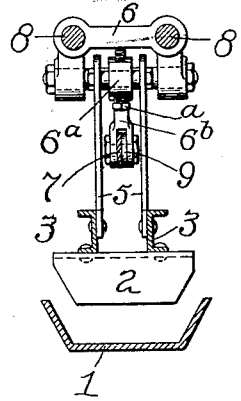
Figure 3:
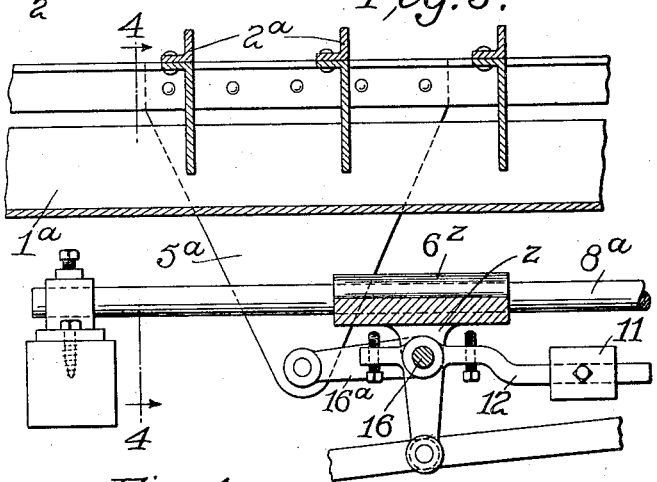
Figure 4:
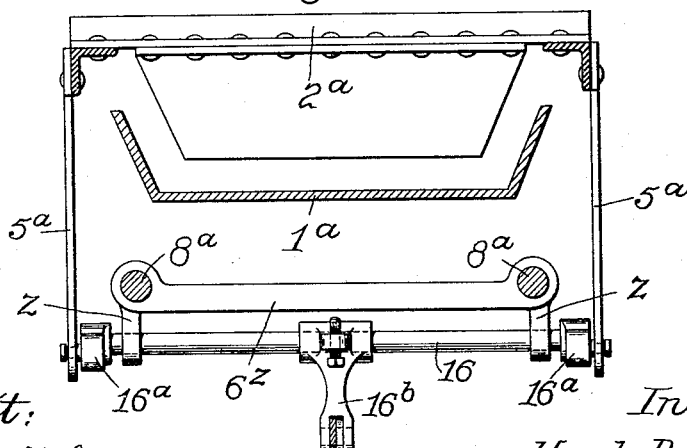
Figure 5:
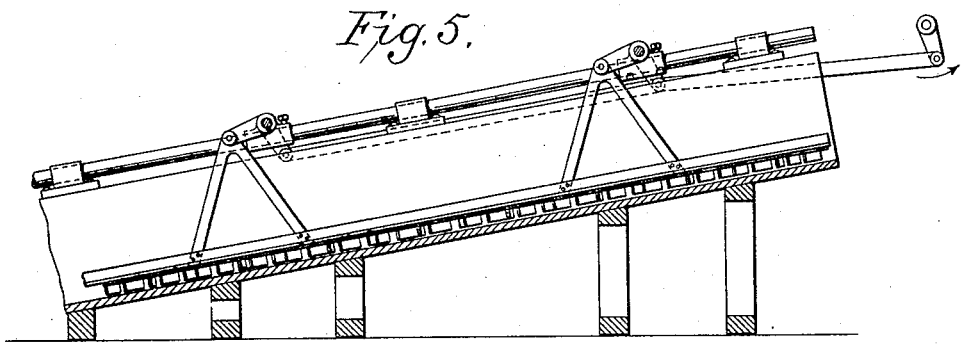
Figure 6:
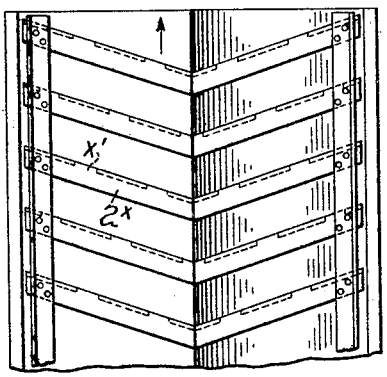
Figure 8:
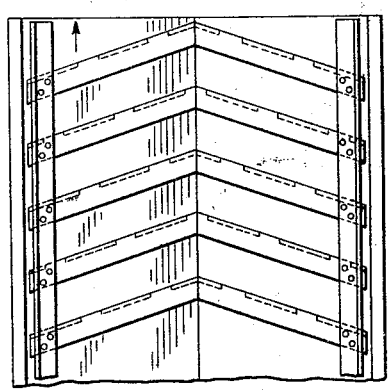
Figure 9:
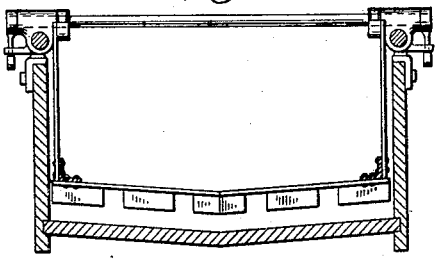

Figure 1 is a side elevation illustrating one form of my conveyer mechanism; Fig. 2 is a transverse section on line 2—2 of Fig. 1, looking in the direction of the upper arrow; Fig. 3 is a sectional elevation showing a form in which the operating mechanism is beneath the conveyer trough; Fig. 4 is a section on line 4—4 of Fig. 3; Fig. 5 is a view of a form in which the conveyer blades have not only a longitudinal conveying action but also a lateral plowing effect on the material being treated; Fig. 6 is a plan view; and Fig. 7 a transverse sectional view of the form shown in Fig. 5; Figs. 8 and 9 are views similar to Figs. 6 and 7, but showing rakes and conveyer trough bottom of reverse inclination transversely.

Referring by reference characters to these drawings, the numeral 1 designates a conveyer trough which of course may be of any desired form, and 2 the conveyer blades conforming to and adapted to be operated within the trough, these blades being carried (suitably spaced) by a bar or bars 3. These bars are suspended by suitable uprights 5 from the arm $6^a$ of bell crank levers, the other arms $6^b$ of which are connected by a link 7. It will be understood of course that there will be as many of the bell crank levers as the length of the rake or conveyer may require, and the arms $6^b$ of all of such bell cranks are connected by links such as 7 so as to cause them to oscillate in unison. These bell cranks are pivotally connected to what I term "sliders" 6 which are mounted to reciprocate upon a suitable support or supports, as for example the rods or bars 8 located above the trough. I limit the amount of rocking movement of the bell cranks by means of suitable stops, and in order that the amount of rocking movement may be varied, I form these stops in the shape of set screws $a$ and $c$, the set screw $a$ passing through the arm $6^a$ of the bell crank and being adapted to impinge against the under side of the slider to one side of the pivot, and the other screw $c$ passing through a short arm $6^c$ extending to the other side of the pivot.

Rocking motion may be imparted to the bell cranks by any suitable means, as, for example, a pitman 9 connected to a crank 10 operated from any suitable source of power.

It will be readily apparent that, supposing the pitman 9 and rod 7 to be moving in the direction of the lower horizontal arrow, Fig. 1, the bell cranks will occupy the position indicated with the arms $6^a$ raised to the limits permitted by the stop $a$ and the rake held clear of the trough, so that in this position the movement of the sliders on the bars 8 will carry the rakes along in a plane above the material in the trough. When the limit of the backward movement is reached and the pitman begins its reverse movement, the first effect is to rock the bell cranks on their pivots, thus causing the arms $6^a$ to descend and lower the rake into the trough until the stop $c$ prevents further rocking movement of the bell crank, whereupon further forward movement of the pitman causes movement of the sliders with the result that the rake is caused to move forward in a lower plane and in engagement with the material to be conveyed.

When the limit of the forward movement is reached and the pitman again begins its return movement, the bell cranks are first rocked to raise the rake and then moved bodily backward, as above described.

In using the term "bell crank lever", it will be obvious that this includes any construction which secures the effect of a bell crank lever. As an example, it may include a two-armed lever pivoted to a stationary axis on the slider, as disclosed in Fig. 1, or it may include a construction in which a rock shaft is used, carrying at one or both ends arms to which the rakes are connected, and having at another part another arm or arms to which the link and actuating device or pitman are connected as shown in Fig. 4.

In the form shown in Figs. 3 and 4 I show the operating mechanism mounted beneath the conveyer trough 1ª and the rake blades suspended from cross bars 2ª connected by the depending members 5ª to arms 16ª secured to opposite ends of a shaft 16. To this shaft is also secured the substantially vertical arm 16ᵇ to which the pitman is connected. The shaft is journaled in bearing lugs z depending from the slider 6ᶻ mounted on the rods or bars 8ª. This form is particularly advantageous for the conveying of heated material as it places the operating mechanism beneath the trough where it is unaffected by the material being operated on.

Figure 7:
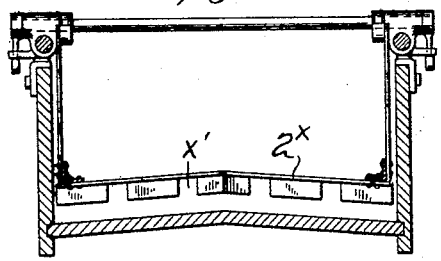

In some cases the weight of the parts suspended from the bell cranks might be so great as to prevent the raising action, the friction of the slider on its support not being sufficient for this purpose. In this event I may provide some counterbalancing means, as for instance a counterweight 11, as shown in Fig. 3, mounted on an arm 12 projecting substantially horizontally from each bell crank (only one of which is shown in this figure).

Where the purpose of the device is not wholly conveying, but also drying or partially drying a material such as sand, I form my rake of oblique and interrupted rabbles so that a plowing action is secured in addition to the forward transportation of the material. These scrapers or rabbles are so disposed with relation to each other that the material not advanced by one transverse set of rabbles owing to the spaces between the blades, will be engaged and moved forward by the next set. That is to say, the rabbles are not placed in rows longitudinally but are staggered so that the longitudinal ridges left by the interruptions are not continuous but broken alternately, thus permitting drainage. One embodiment of this is shown in Figs. 5, 6 and 7, in which the bottom of the inclined trough is not flat but slopes downwardly from the center to the sides, the rakes 2ˣ being formed as in Figs. 6 and 7, so as to force the sand up the center of the trough and allow the excess moisture to drain downward to and along the sides of the trough, it being understood that the plowing or scraping action takes place when the rake is moving in the direction of the arrow. The interruptions in the scrapers shown at x' increase the plowing action and promote good drainage. An obvious variation would be a trough having the bottom downwardly inclined toward the center, in which modification the inclination of the rabbles would be the reverse of that shown, the sand would be delivered at the two sides of the discharge end and the drainage would be backward along the center of the trough, as shown in Figs. 8 and 9.

In Fig. 5 the bar constitutes the slider, and this figure shows one method of constructing a conveyer mechanism according to my invention embodying more than one bell crank on the slider with stops to but one of the bell cranks.

Having thus described my invention what I claim is:

1. In combination a conveyer trough, a plurality of conveyer blades or flights for operating within the same, a plurality of bell cranks having substantially horizontally extending arms and substantially vertically disposed arms, means connecting said horizontal arms with said rake blades, slidable means by which said bell cranks are pivotally supported, push and pull means connected with said vertical arms, and means for limiting the rocking of the bell cranks.

2. In combination a conveyer trough, a bar arranged substantially parallel with said trough and having connected thereto a plurality of rakes, rabbles or blades depending within the trough, slidable means arranged to reciprocate substantially parallel with said trough, a plurality of bell cranks pivotally supported by said slidable means and having substantially horizontally disposed arms connected to said bar and having substantially vertically disposed arms, push and pull means connected to said vertically disposed arms, and means for limiting the rocking movement of the bell cranks.

3. In combination a conveyer trough, a bar arranged substantially parallel with said trough and having connected thereto a plurality of rakes, rabbles or blades depending within the trough, slidable means arranged to reciprocate substantially parallel with said trough, a plurality of bell cranks pivotally supported by said slidable means and having substantially horizontally disposed arms connected to said bar and having substantially vertically disposed arms, counterbalancing means connected to said bell cranks, push and pull means connected to said vertically disposed arms, and means for limiting the rocking movement of the bell cranks.

4. In combination a conveyer trough, a pair of bars arranged above said trough, rakes, rabbles or blades connected to said bars and depending within the trough, slidable means located beneath the trough adapted to reciprocate substantially parallel thereto, rock shafts pivotally supported by said slidable means and having substantially horizontally disposed arms, uprights depending from the bars to which said arms are connected, substantially vertically disposed arms carried by said rock shaft and push and pull means connected to said vertically disposed arms, and means for limiting the oscillating motion of the rock shafts.

5. In combination a conveyer trough, a plurality of blades, rabbles or flights for operating within the same, a plurality of rock shafts having substantially horizontally extending arms, said rock shafts being journaled on sliders, an arm extending substantially vertically from one of the rock shafts, means for connecting said horizontally extending arms with said rake blades, means for limiting the oscillation of the rock shafts, a push and pull device operatively connected to the vertically extending arm, means for causing the sliders to reciprocate in unison and means for causing the rock shafts to oscillate in unison.

In testimony whereof, I affix my signature in presence of two witnesses.

HUGH B. LOWDEN.

Witnesses:
 LEON E. HOFFMAN,
 HARRY F. MILLS.

Copies of this patent may be obtained for five cents each, by addressing the "Commissioner of Patents, Washington, D. C."